US011392917B2

(12) United States Patent
Naitou et al.

(10) Patent No.: US 11,392,917 B2
(45) Date of Patent: Jul. 19, 2022

(54) ARTICLE READING DEVICE

(71) Applicant: TOSHIBA TEC KABUSHIKI KAISHA, Tokyo (JP)

(72) Inventors: Hidehiro Naitou, Mishima Shizuoka (JP); Hitoshi Iizaka, Fuji Shizuoka (JP); Hidehiko Miyakoshi, Mishima Shizuoka (JP); Yuichiro Hatanaka, Mishima Shizuoka (JP); Yuta Sasaki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 16/818,341

(22) Filed: Mar. 13, 2020

(65) Prior Publication Data
US 2020/0219081 A1  Jul. 9, 2020

Related U.S. Application Data

(63) Continuation of application No. 15/691,319, filed on Aug. 30, 2017, now abandoned.

(51) Int. Cl.
*G06Q 20/20* (2012.01)
*G06V 10/40* (2022.01)
(Continued)

(52) U.S. Cl.
CPC ....... *G06Q 20/208* (2013.01); *G06K 7/10722* (2013.01); *G06K 7/1413* (2013.01);
(Continued)

(58) Field of Classification Search
None
See application file for complete search history.

(56) References Cited

U.S. PATENT DOCUMENTS 6,363,366 B1 * 3/2002 Henty ................. G07G 1/0054
382/110
2005/0231370 A1 * 10/2005 Tagato ................. G07F 7/1008
340/572.1
(Continued)

FOREIGN PATENT DOCUMENTS

JP  2013-089084 A  5/2013
JP  2013-178750 A  9/2013
(Continued)

OTHER PUBLICATIONS

Extended European Search Report dated Jan. 24, 2018 in corresponding European Patent Application No. 17187743.4, 8 pages.
(Continued)

*Primary Examiner* — Paul Danneman
(74) *Attorney, Agent, or Firm* — Kim & Stewart LLP

(57) ABSTRACT

An article reading device according to an embodiment includes a display device and an image capturing device that generates an image of an article. A processor extracts, from the image, first feature data for recognizing the article and second feature data for determining whether to recognize the article based on the first feature data. The processor determines whether to recognize the article. If it is determined to recognize the article, the processor recognizes the article based on the extracted first feature data, and controls the display device to display a recognition result. If it is determined to not recognize the article, extract a barcode from the image, the processor identifies the article based on the extracted barcode, and control the display device to display
(Continued)

an identification result. The processor performs a transaction settlement with respect to the recognition result, if any, and the identification result, if any.

20 Claims, 12 Drawing Sheets

(51) Int. Cl.
- *G07G 1/00* (2006.01)
- *G06V 10/75* (2022.01)
- *G06V 30/224* (2022.01)
- *G06K 7/10* (2006.01)
- *G06K 7/14* (2006.01)
- *G06V 20/68* (2022.01)

(52) U.S. Cl.
CPC .............. *G06V 10/40* (2022.01); *G06V 10/75* (2022.01); *G06V 30/224* (2022.01); *G07G 1/0045* (2013.01); *G07G 1/0063* (2013.01); *G06V 20/68* (2022.01)

(56) References Cited

U.S. PATENT DOCUMENTS

| | | |
|---|---|---|
| 2014/0067574 A1 | 3/2014 | Miyakoshi |
| 2016/0132855 A1 | 5/2016 | Yamamoto |
| 2016/0140534 A1 | 5/2016 | Iizaka |

FOREIGN PATENT DOCUMENTS

| | | |
|---|---|---|
| JP | 2016-095765 A | 5/2016 |
| JP | 2016-095801 A | 5/2016 |

OTHER PUBLICATIONS

Notice of Reasons for Refusal dated Sep. 8, 2020 in corresponding Japanese Patent Application No. 2016-171795, 6 pages (with Translation).

Notice of Reasons for Refusal dated Nov. 16, 2021 in corresponding Japanese Patent Application No. 2020-208557, 6 pages (with Translation).

* cited by examiner

| f1 MERCHANDISE ID | f2 MERCHANDISE CLASSIFICATION | f3 MERCHANDISE NAME | ... | f4 UNIT PRICE | f5 ILLUSTRATION IMAGE | f6 FEATURE DATA |
|---|---|---|---|---|---|---|
| XXXXXXX | VEGETABLE | AA1 | ... | 100 YEN |  | YYYYYYY |
| XXXXXXX | VEGETABLE | AA1/2 | ... | 50 YEN |  | YYYYYYY |
| XXXXXXX | FRUIT | YY | ... | 100 YEN |  | YYYYYYY |

# ARTICLE READING DEVICE

CROSS-REFERENCE TO RELATED APPLICATION

This application is a continuation of U.S. patent application Ser. No. 15/691,319, filed Aug. 30, 2017, which is based upon and claims the benefit of priority from Japanese Patent Application No. 2016-171795, filed Sep. 2, 2016, the entire contents of which are incorporated herein by reference.

FIELD

Embodiments described herein relate generally to an article reading device.

BACKGROUND

In the related art, when merchandise is to be sold at a store, a salesperson registers the merchandise by reading a barcode attached to the merchandise. In addition, if the barcode is not attached to the merchandise, the salesperson compares the merchandise with a plurality of selection buttons corresponding to respective merchandise items displayed on a screen, operates a selection button corresponding to the merchandise, and registers the merchandise. On the other hand, there is also a technique in which merchandise registration is performed using generic object recognition for recognizing types or the like of merchandise by extracting feature data of the merchandise from captured images obtained by imaging the merchandise and by comparing the extracted feature data with verification data prepared in advance. Accordingly, a device which can execute both of merchandise registration based on a barcode and merchandise registration based on an object recognition result without performing an operation such as switching has been developed.

As described above, in an article reading device which can execute the barcode reading and object recognition without performing the switching operation, it is desirable to simultaneously display a selection button instructing merchandise registration and an image of merchandise actually captured on a screen, in order to increase efficiency of merchandise registration. However, since two different pieces of information are displayed in one screen, respective display ranges are reduced and it is difficult to view display contents. Accordingly, there is a problem that efficiency of a registration operation is reduced.

DETAILED DESCRIPTION

Embodiments provide an article reading device capable of simultaneously executing barcode reading and object recognition so that a captured image of merchandise can be displayed for easy viewing without performing a special operation as necessary.

An article reading device according to an embodiment includes a display device and an image capturing device that generates an image of an article. A processor receives the generated image of the article and extracts from the image, first feature data for recognizing the article and second feature data for determining whether to recognize the article based on the first feature data. The processor determines, based on the extracted second feature data, whether to recognize the article. If it is determined to recognize the article, the processor recognizes the article based on the extracted first feature data, and controls the display device to display a recognition result corresponding to the recognized article. If it is determined to not recognize the article, extract a barcode from the image, the processor identifies the article based on the extracted barcode, and control the display device to display an identification result corresponding to the identified article. The processor performs a transaction settlement with respect to the recognition result, if any, and the identification result, if any.

Descriptions of Overall Configuration of Check-Out System

Hereinafter, embodiments of an article reading device and a program will be described with reference to drawings. In the present embodiment, as an example of the article reading device and the program, a check-out system 1 including an article reading device 101 provided in a store such as a supermarket is described.

Figure 1:
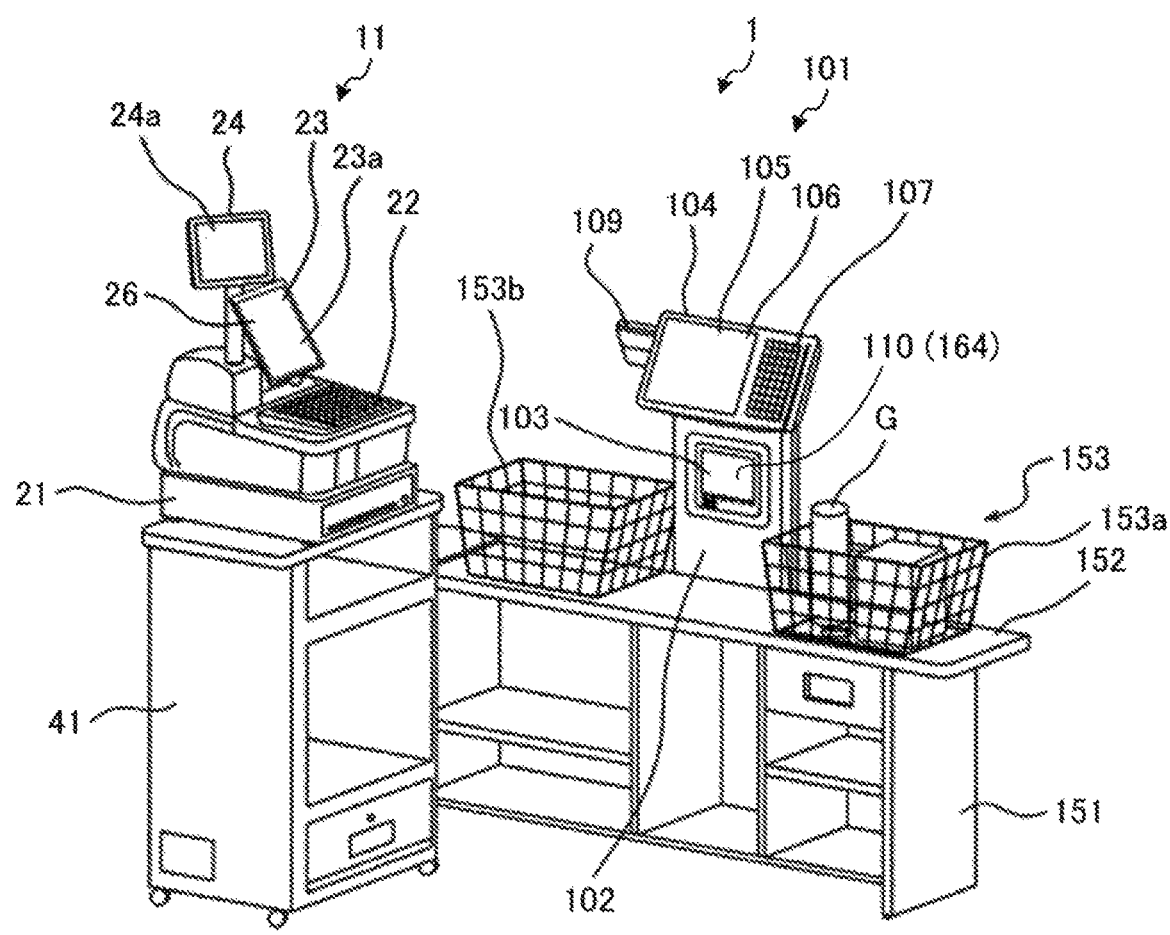
FIG. 1 is an exterior perspective view illustrating an example of a check-out system including an article reading device according to an embodiment.

FIG. 1 is an exterior perspective view illustrating an example of the check-out system 1. As illustrated in FIG. 1, the check-out system 1 includes the article reading device 101 which captures an image of an article (or merchandise) which is a registration target when performing sales registration and reads feature data included in the captured image of the article. The article reading device also reads identification information of a barcode or the like attached to the article. In addition, the check-out system 1 includes a merchandise settlement device (POS (Point-of-Sale) terminal) 11 which performs sales registration for merchandise read by the article reading device 101 and performs a settlement process. The POS terminal 11 chooses a merchandise candidate based on the feature data of the article output by the article reading device 101. In addition, the POS terminal 11 provides the merchandise candidate to a salesperson (e.g., cashier) and allows the salesperson to select the correct merchandise. In the check-out system 1 of the embodiment, the article reading device 101 specifies merchandise with respect to natural objects such as vegetables, fruits, meat, and the like by object recognition.

Other merchandise (for example, manufactured objects and the like) is specified by reading a barcode attached to the merchandise.

In an example of FIG. 1, the POS terminal 11 is positioned on a drawer 21, on a cash register counter 41. The POS terminal 11 has a keyboard 22 on which keys for operation are arranged on an upper surface of the POS terminal 11. In addition, the POS terminal 11 has a first display device 23 used for displaying registration information and receiving an input of information required for settlement by the cashier. A second display device 24 is positioned above the keyboard 22 and is used for displaying the registration information to a customer. The first display device 23 has a display panel 23a such as a liquid crystal panel and is a touch input type in which a touch panel 26 is overlaid on display panel 23a. The second display device 24 has a display panel 24a such as a liquid crystal panel. The second display device 24 is positioned at an upper portion of the POS terminal 11 so as to be rotatable in a direction easy to see from the customer. The drawer 21 accommodates bills, coins, and the like therein and is opened by an instruction from the POS terminal 11.

Next to the cash register counter 41, a table 151 arranged is provided, forming an L-shape together with the cash register counter 41. On an upper surface of the table 151, a load receiving surface 152 for placing a shopping basket 153 and the like is formed. FIG. 1 illustrates an example in which the shopping basket 153 includes a first shopping basket 153a and a second shopping basket 153b. The first shopping basket 153a is a shopping basket which the customer brought, that is, a shopping basket containing articles (for example, an article G) before reading. The second shopping basket 153b is a shopping basket for accommodating the article G after reading. After the cashier picks up, for example, the article G from the first shopping basket 153a and causes the article reading device 101 to read the article G, the cashier transfers the article G to the second shopping basket 153b. The shopping basket 153 is not limited to a basket shape but may be a tray shape, a box shape, a bag shape, or the like.

The article reading device 101 is positioned at a central portion of the load receiving surface 152 of the table 151 and is connected with the POS terminal 11 so as to be able to transmit and receive data by wire or wireless. The article reading device 101 includes a reading unit 110 in which a reading window 103 is disposed on a front surface (cashier side) in a housing 102. The reading window 103 is made of, for example, a transparent glass plate or the like with transparency. In addition, the article reading device 101 includes a display/operation unit 104 at an upper portion of the housing 102. The display/operation unit 104 has a third display device 106 such as a liquid crystal panel. The cashier uses the display/operation unit 104 for checking information of an image and the like read by the reading unit 110 and for an input of information when selecting merchandise among merchandise candidates recognized by the article reading device 101. A touch panel 105 is overlaid on a screen of the third display device 106 so that a touch input can be performed. In addition, a keyboard 107 is provided on a right side of the third display device 106, so that a keyboard input can be performed by the cashier. Further, the article reading device 101 includes a fourth display device 109 on a rear side (e.g., customer side) of the display/operation unit 104 for the customer to check a reading result and the like of the article G by the customer.

The reading unit 110 includes an imaging unit 164 for imaging the article G in a back of the reading window 103. When the article G is imaged by the imaging unit 164, the reading unit 110 extracts feature data of the article G among images of the imaged article G and outputs the extracted feature data to the POS terminal 11. In addition, when recognizing that a code symbol such as a barcode for identifying the article G exists in the captured image, the reading unit 110 reads contents of the barcode and specifies the article G.

The display/operation unit 104 displays various screens such as a pre-set screen, a selection screen of a merchandise candidate, and the like output from the POS terminal 11 to the third display device 106. The pre-set screen includes a plurality of selection buttons for selecting merchandise. The selection screen is a screen on which merchandise candidate information read by the reading unit 110 is displayed. Details of a screen configuration will be described below.

In addition, the display/operation unit 104 displays an image captured by the imaging unit 164 on the third display device 106 which is an example of a display unit. By viewing the captured image displayed on the third display device 106, the cashier checks whether or not the article G is properly captured. The cashier checks the captured image displayed on the third display device 106. When an inappropriate image is captured for reading such as occurrence of frame-out of the article G, occurrence of a blur, or the like, the cashier instructs the reading unit 110 to read the article G again.

Descriptions of Hardware Configuration of Check-Out System

Figure 2:
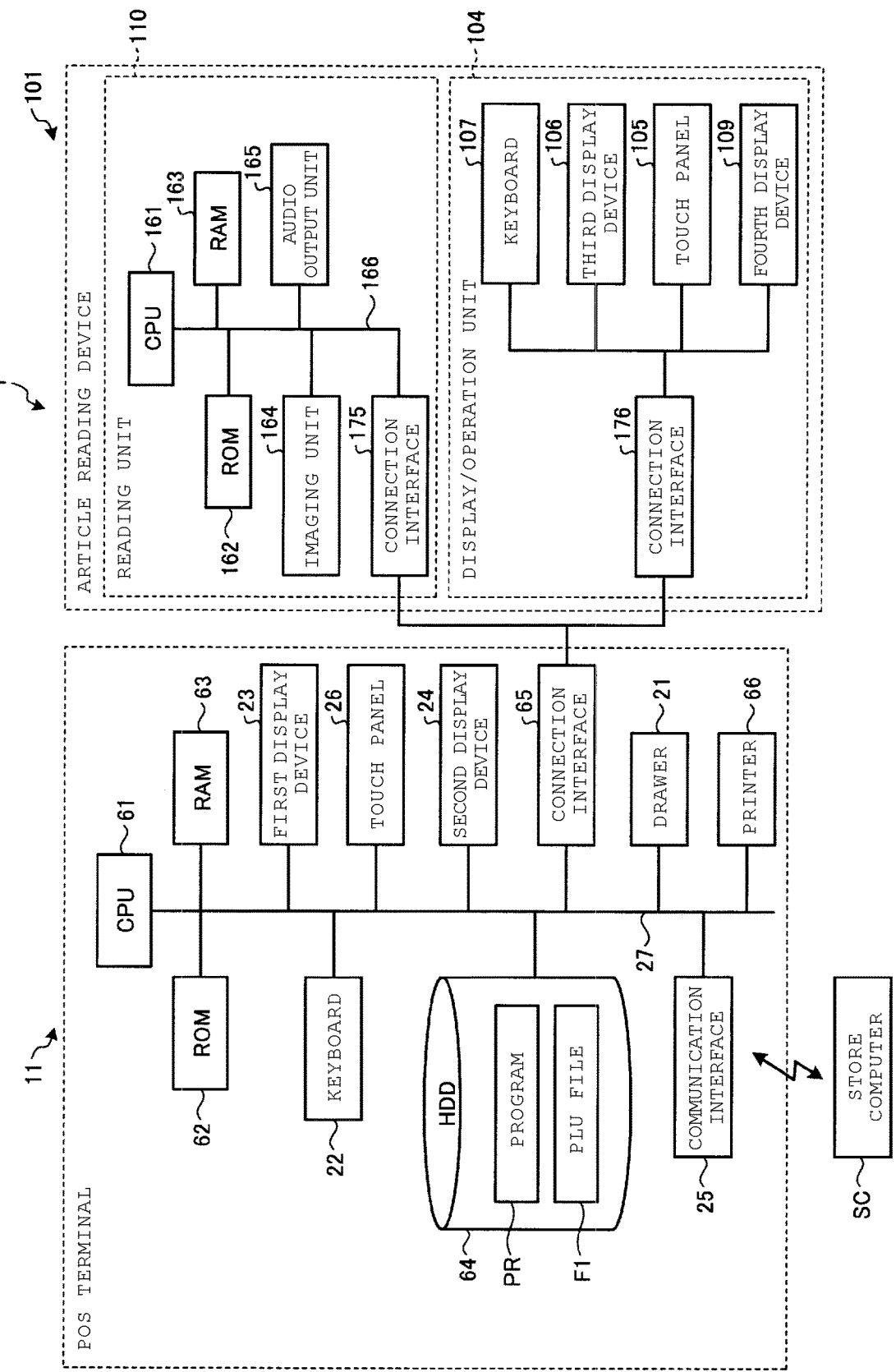
FIG. 2 is a block diagram illustrating an example of a hardware configuration of the check-out system.

Next, a hardware configuration of the POS terminal 11 and the article reading device 101 will be described. FIG. 2 is a block diagram illustrating the hardware configuration of the POS terminal 11 and the article reading device 101. The POS terminal 11 includes a Central Processing Unit (CPU) 61, a Read Only Memory (ROM) 62, a Random Access Memory (RAM) 63, a Hard Disk Drive (HDD) 64, a connection interface 65, a printer 66, the drawer 21, the keyboard 22, the first display device 23, the second display device 24, a communication interface 25, the touch panel 26, and the like. The CPU 61, the ROM 62, and the RAM 63 are connected with each other by an internal bus 27. In addition, all of the drawer 21, the keyboard 22, the first display device 23, the second display device 24, the communication interface 25, the touch panel 26, the HDD 64, the connection interface 65, and the printer 66 are connected to the internal bus 27 described above via various input/output circuits (not illustrated)

The CPU 61 is a central processing unit which controls the overall POS terminal 11. The ROM 62 is a nonvolatile memory which stores fixed programs and the like. The RAM 63 is a volatile memory used by the CPU 61 as a work area or the like.

The HDD 64 is a memory unit which stores various programs or various files. The various programs include a program PR for merchandise sales data processing including a process of determining a merchandise candidate and displaying information indicating the merchandise candidate on a selection screen, and the like. The various files include a PLU file F1 and the like that is, for example, transmitted from a store computer SC and stored. In addition, the HDD 64 stores a registration table, a sales table, or the like for registering merchandise.

The communication interface 25 is configured with a network card or the like for performing data communication with the store computer SC. The store computer SC is installed in a back office or the like of a store. The store computer SC may store the PLU file F1 and the like for transmitting to the POS terminal 11 in an HDD (not illustrated).

The connection interface 65 is an interface for communicating with a connection interface 175 or a connection interface 176 of the article reading device 101. The communication is performed by wire or wireless. The printer 66 is a printing device which prints transaction contents on a receipt or the like and discharges the receipt.

The article reading device 101 includes the reading unit 110 and the display/operation unit 104. The reading unit 110 has a CPU 161, a ROM 162, a RAM 163, the imaging unit 164, an audio output unit 165, and the connection interface 175. In addition, the display/operation unit 104 has the connection interface 176, the touch panel 105, the third display device 106, the keyboard 107, and the fourth display device 109.

The CPU 161, the ROM 162, and the RAM 163 are connected with each other by an internal bus 166. In addition, all of the imaging unit 164, the audio output unit 165, and the connection interface 175 are connected to the internal bus 166 described above via various input/output circuits (not illustrated). Then, all of the touch panel 105, the third display device 106, the keyboard 107, and the fourth display device 109 are connected to the connection interface 176.

The CPU 161 is a central processing unit which controls the overall article reading device 101. The ROM 162 is a nonvolatile memory which stores control programs and the like. The control program includes a program or the like for a process of extracting feature data from a captured image and outputting the extracted feature data to the POS terminal 11. The RAM 163 is a volatile memory used by the CPU 161 as a work area or the like.

The imaging unit 164 is a color image sensor having an imaging element such as a Charge Coupled Device (CCD), a Complementary Metal Oxide Semiconductor (CMOS), or the like. The imaging unit 164 starts imaging by receiving an imaging start signal from the CPU 161, converts light reflected from the article G held by the reading window 103 to an electric signal at a predetermined frame rate (for example, 30 fps), and sequentially outputs the captured image.

The audio output unit 165 has a reproduction circuit, such as a speaker for playing a pre-set reading sound (e.g., "beep"), warning sound, voice, and the like. The audio output unit 165 plays the reading sound, the warning sound, the voice, and the like based on a control signal from the CPU 161 and notifies a reading state or the like of the article G by the sound.

Further, the connection interface 175 is connected to the CPU 161. The connection interface 175 communicates with the connection interface 65 of the POS terminal 11 and thereby performs data transmission and reception between the article reading device 101 and the POS terminal 11.

The connection interface 176 communicates with the connection interface 65 of the POS terminal 11 and thereby performs data transmission and reception between the article reading device 101 and the POS terminal 11.

Here, the PLU file F1 will be described. The PLU file F1 is a data file in which merchandise information and feature data of the merchandise are associated with each other for each of the articles G. The merchandise information is merchandise identification information (merchandise ID or the like) for uniquely identifying merchandise, merchandise classification, an illustration image showing merchandise, information indicating a unit price, and the like. The feature data includes, for example, a surface state (e.g., texture) such as color tone or unevenness of the surface, which indicates a feature of each of the articles G previously extracted from a sample image of each of the articles G by a predetermined algorithm.

Figure 3:
FIG. 3 illustrates an example configuration of a PLU file.
Figure 3:
Figure 3:

FIG. 3 illustrates an example of a data configuration of the PLU file F1. The PLU file F1 stores data in which the merchandise information and the feature data of the merchandise are associated with each other for each of the articles G. In an example illustrated in FIG. 3, data such as a merchandise ID field f1, a merchandise classification field f2, a merchandise name field f3, an unit price field f4, an illustration image field f5, and the like is stored as merchandise information. Data in feature data field f6 of the merchandise is associated with the merchandise information. The data stored in the feature data field f6 is used as data for verification when determining a similarity to be described below. Data "XXXXXXXX" illustrated in the merchandise ID field f1 is a value uniquely corresponding to each piece of merchandise. Data "YYYYYYYY" illustrated in the feature data field f6 is a value calculated for each piece of merchandise.

Descriptions of Functional Configuration of Check-Out System

Figure 4:
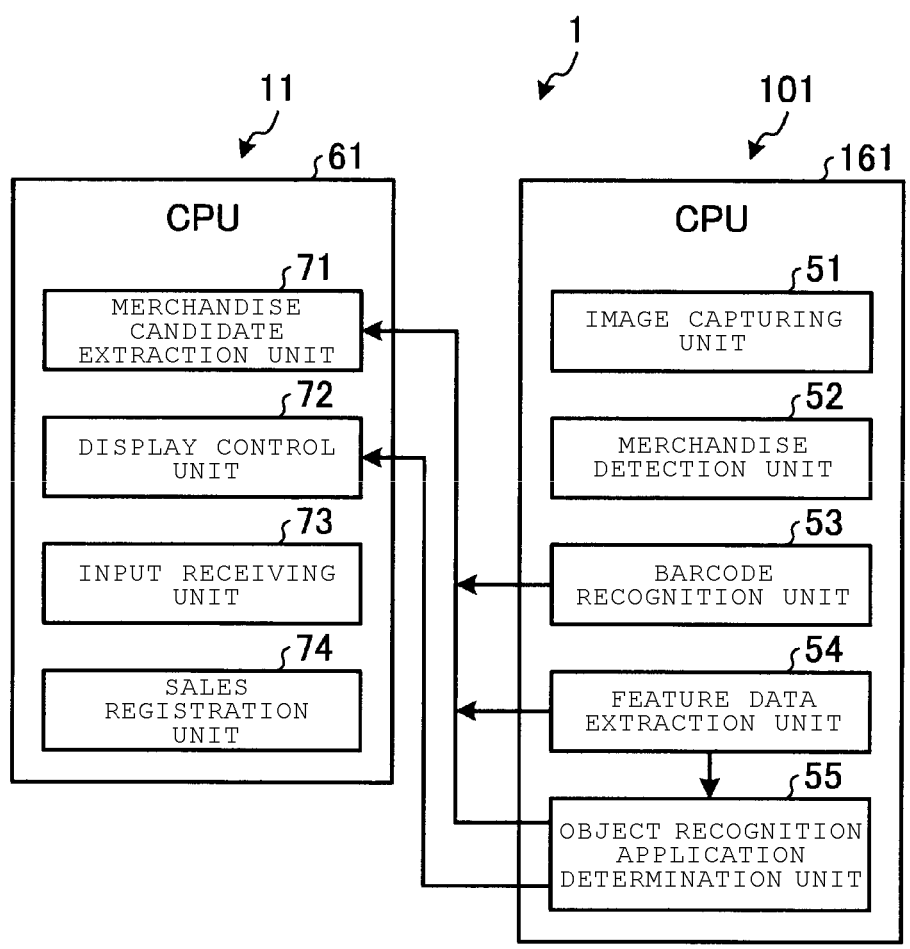
FIG. 4 is a block diagram illustrating an example of a functional configuration of the check-out system.

Next, a functional configuration of the POS terminal 11 and the article reading device 101 of the check-out system 1 will be described. FIG. 4 is a block diagram illustrating an example configuration of a functional block of each of the POS terminal 11 and the article reading device 101. In the article reading device 101, the CPU 161 illustrated in FIG. 2 appropriately executes a program stored in the ROM 162. Accordingly, as illustrated in FIG. 4, an image capturing unit 51, a merchandise detection unit 52, a barcode recognition unit 53, a feature data extraction unit 54, and an object recognition application determination unit 55 are realized as functional units by the CPU 161. In one embodiment, the CPU 161 is a processor that is programmed to carry out the functions of the image capturing unit 51, the merchandise detection unit 52, the barcode recognition unit 53, the feature data extraction unit 54, and the object recognition application determination unit 55. In another embodiment, the CPU 61 is a hardware controller, e.g., an application specific integrated circuit (ASIC) and field programmable gate array (FPGA), that is configured to carry out the functions of the image capturing unit 51, the merchandise detection unit 52, the barcode recognition unit 53, the feature data extraction unit 54, and the object recognition application determination unit 55.

In addition, in the POS terminal 11, the CPU 61 illustrated in FIG. 2 appropriately executes a program stored in the ROM 62 and the program PR stored in the HDD 64. Accordingly, as illustrated in FIG. 4, a merchandise candidate extraction unit 71, a display control unit 72, an input receiving unit 73, and a sales registration unit 74 are realized as functional units by the CPU 61. In one embodiment, the CPU 61 is a processor that is programmed to carryout the functions of the merchandise candidate extraction unit 71, the display control unit 72, the input receiving unit 73, and the sales registration unit 74. In another embodiment, the CPU 61 is a hardware controller, e.g., an application specific integrated circuit (ASIC) and field programmable gate array (FPGA), that is configured to carry out the functions of the merchandise candidate extraction unit 71, the display control unit 72, the input receiving unit 73, and the sales registration unit 74.

The image capturing unit 51 outputs an imaging start signal to the imaging unit 164 (FIG. 2) and starts an imaging operation of the imaging unit 164. After that, the image capturing unit 51 obtains the image captured and output by the imaging unit 164 and sequentially stores the image in the RAM 163 (FIG. 2).

The merchandise detection unit 52 detects that the article G is held near the reading window 103 (FIG. 1) based on a plurality of successive images captured and output by the imaging unit 164. Specifically, the merchandise detection unit 52 reads the captured image output by the imaging unit 164 (FIG. 2) from the RAM 163 (FIG. 2) and compares luminance of the captured image with luminance of a captured image read most recently. The merchandise detection unit 52 determines that the captured image includes reflection of hands, the article G, and the like with a condition that luminance gradation is changed according to comparison of luminance. Further, the merchandise detection unit 52 binarizes the captured image having the reflection and the successive captured image and extracts a contour line of the article G. When a position of a contour line of the successive captured image is changed, the merchandise detection unit 52 specifies that an area inside the contour line is an area indicating the article G held by the reading window 103. In this way, the merchandise detection unit 52 detects that the article G is held by the reading window 103.

A method of specifying that the article G is held is not limited to the method described above and other methods may be used. For example, it may be specified not by the contour line of the article G in the captured image but by presence or absence of a flesh color area. That is, in a case where there is the flesh color area inside the captured image, it is expected that the cashier's hands are reflected. Therefore, for example, a contour line may be extracted from the captured image and an area inside the contour line of a position at which the article is gripped may be specified as an area indicating the article G among contour lines showing a shape of the hands.

The barcode recognition unit 53 is an example of a barcode reading unit and recognizes that a code symbol such as a barcode is imaged in the captured image. In addition, the barcode recognition unit 53 performs a reading process of reading a recognized barcode and provides a reading result to the merchandise candidate extraction unit 71. In addition, in a case where the code symbol such as a barcode or the like is not imaged in the captured image, the barcode recognition unit 53 provides notification that the barcode is not read to the merchandise candidate extraction unit 71. Since a method of determining whether or not the barcode is imaged in the captured image or a method of reading code information of the barcode imaged in the captured image is already used as a known technique, details of the description will be omitted.

The feature data extraction unit 54 is an example of an extraction unit and extracts feature data 80a included in a recognition target article for object recognition from an area of the article G imaged in the captured image. Then, the feature data extraction unit 54 outputs the extracted feature data 80a to the merchandise candidate extraction unit 71 of the POS terminal 11. Specifically, the feature data extraction unit 54 reads a captured image from the RAM 163. Then, the feature data extraction unit 54 specifies an area of the article G from the captured image. Next, the feature data extraction unit 54 extracts the feature data 80a corresponding to the feature data field f6 registered in the PLU file F1 in advance as the feature data 80a included in the recognition target article for object recognition with respect to an inside of the specified area. The feature data extraction unit 54 outputs the extracted feature data 80a to the connection interface 175 (FIG. 2). The connection interface 175 outputs the received feature data 80a to the connection interface 65 (FIG. 2) and provides the feature data 80a via the connection interface 65 to the merchandise candidate extraction unit 71.

In addition, the feature data extraction unit 54 extracts feature data 80b for determining whether or not the article G is a non-target article for object recognition from an area of the article G imaged in the captured image. For example, in the present example, merchandise is identified by object recognition for natural objects such as vegetables, fruits, meat, and the like and the merchandise is identified by a barcode attached to merchandise for manufactured objects. Then, the feature data extraction unit 54 extracts the feature data 80b for distinguishing whether an area of the article G imaged in the captured image is manufactured objects or natural objects. Specifically, the feature data 80b which is not present in natural objects such as vegetables, fruits, meat, and the like among feature data common to artificial objects such as plastic, paper, cloth, or the like is selected and is used.

The object recognition application determination unit 55 is an example of a determination unit and determines whether or not the article G imaged in the captured image is a non-target article for object recognition based on whether the feature data 80b is extracted by the feature data extraction unit 54. Further, the object recognition application determination unit 55 determines that it is necessary to read a barcode so as to identify the article G on the condition that the article G imaged in the captured image is determined to be a manufactured object, that is, a non-target article for object recognition. On the other hand, the object recognition application determination unit 55 determines that it is necessary to perform object recognition so as to identify the article G on condition that the article G imaged in the captured image is determined to be a natural object, that is, a recognition target article for object recognition. A determination result of the object recognition application determination unit 55 is provided to the merchandise candidate extraction unit 71 and the display control unit 72.

The merchandise candidate extraction unit 71 is an example of an object recognition unit and performs an object recognition process for recognizing the article G inside the captured image. Specifically, the merchandise candidate extraction unit 71 calculates a similarity by comparing the feature data 80a of the article G provided by the feature data extraction unit 54 with the feature data field f6 of each piece of merchandise registered in the PLU file F1 (FIG. 3). Further, the merchandise candidate extraction unit 71 chooses merchandise having similarity is equal to or larger than a predetermined threshold among the PLU file F1 as a candidate of the article G. The merchandise candidate extraction unit 71 outputs the chosen merchandise candidate information to the display control unit 72. In addition, the merchandise candidate extraction unit 71 identifies the merchandise by verifying the merchandise ID field f1 read by the barcode recognition unit 53 with the PLU file F1 with respect to the article G to which a barcode is attached. The merchandise candidate extraction unit 71 outputs the identifies merchandise information to the display control unit 72.

The object recognition for recognizing the article G included in an image is also called generic object recognition. Since various recognition techniques used for generic object recognition are described in detail in the related art, the description will be omitted. Example generic object recognition techniques are describe in the following: Yanai Keiji, "Current and Future of Generic Object Recognition", Journal of Information Processing Society, Vol. 48, No. SIG16 [Search on Aug. 5, 2016], Internet <URL: http://mm.cs.uec.ac.jp/IPSJ-TCVIM-Yanai.pdf>

Jamie Shotton, "Semantic Texton Forests for Image Categorization and Segmentation", [Search on Aug. 5, 2016], Internet <URL: http://mi.eng.cam.ac.uk/~cipolla/publications/inproceedings/2008-CVPR-semantic-texton-forests.pdf>

Here, in a case where, for example, the feature data field f6 of each of articles inside the PLU file F1 is set to 100%="similarity: 1.0", the similarity calculated when the merchandise candidate extraction unit 71 performs object recognition and specifies the article G indicates how similar the feature data 80a of the article G imaged in the captured image is. A similarity may be calculated by absolute evaluation or relative evaluation.

For example, a similarity is calculated by absolute evaluation. In this case, the feature data 80a of the article G imaged in the captured image and the feature data field f6 of each of articles registered in the PLU file F1 are compared one by one and a similarity calculated as a result of this comparison is adopted as-is. Here, it is assumed that a similarity of 95% is set as a threshold. In this case, the merchandise candidate extraction unit 71 sequentially assigns merchandise having a similarity of 95% equal to or more in order of similarities and outputs the merchandise to the display control unit 72.

In addition, similarities may be calculated by relative evaluation. In this case, similarities are calculated so that a total of the similarities to the merchandise of the PLU file F1 is 1.0 (100%). For example, it is assumed that the feature data of five pieces of merchandise in the PLU file F1 are registered in the feature data field f6. In this case, for example, a similarity for the first merchandise is "0.6", a similarity for the second merchandise is "0.1", a similarity for the third merchandise is "0.1", a similarity for the fourth merchandise is "0.1", and a similarity for the fifth merchandise is "0.1", so that a total of the similarities is always 1.0. Here, it is assumed that a similarity 0.5 is a threshold. In this case, the merchandise candidate extraction unit 71 sequentially assigns merchandise information of merchandise having a similarity 0.5 equal to or more in order of similarities and outputs the merchandise to the display control unit 72.

The display control unit 72 is an example of a display control unit and controls respective display states of the first display device 23, the second display device 24, the third display device 106, and the fourth display device 109 (all are illustrated in FIG. 2). The display control unit 72 controls the display states of the first display device 23 and the second display device 24 via the internal bus 27. In addition, the display control unit 72 controls the display states of the third display device 106 and the fourth display device 109 via the connection interface 65 and the connection interface 176. Hereinafter, a configuration will be described with respect to exemplary embodiments of the present disclosure, in which the display control unit 72 controls the display state of the third display device 106.

The display control unit 72 displays a pre-set screen G1 (see FIG. 5A) on which a plurality of selection buttons for selecting merchandise are arranged at predetermined positions on the third display device 106. Further, when receiving merchandise candidate information from the merchandise candidate extraction unit 71, the display control unit 72 displays a selection screen G2 (see FIG. 5B) having merchandise candidate information with respect to the third display device 106.

Specifically, the display control unit 72 generates update information of the pre-set screen G1 as a setting indicating a merchandise candidate by setting a display of selection buttons of, for example, top four merchandise candidates chosen as merchandise candidate information. The display control unit 72 outputs update information of the pre-set screen G1 to the connection interface 65. The output update information is output from the connection interface 65 to the third display device 106 via the connection interface 176. Accordingly, a display screen of the third display device 106 transitions from the pre-set screen G1 to the merchandise candidate selection screen G2.

In addition, on condition that the object recognition application determination unit 55 determines that it is necessary to perform an object recognition process for specifying the article G imaged in the captured image, the display control unit 72 controls a display form when a captured image captured by the imaging unit 164 is displayed on the third display device 106. Specific control contents of the display form will be described below.

The input receiving unit 73 receives various input operations from an input/output device such as the keyboards 22 and 107 and the touch panels 26 and 105. For example, while a merchandise candidate selection screen is displayed on the third display device 106, the cashier presses a selection button of the keyboard 107 or touches a selection button of the touch panel 105. In this case, operation information of the operated selection button is output from the input/output device to the connection interface 176. The operation information is output from the connection interface 176 to the connection interface 65 and is provided to the input receiving unit 73 via the connection interface 65.

Based on the operation information of the selection button received from the keyboard 107 or the touch panel 105 by the input receiving unit 73, the sales registration unit sales-registers merchandise information of a piece of merchandise corresponding to the operation information. That is, the sales registration unit adds the merchandise information to a registration table or the like. In addition, based on the closing operation information received from the touch panel 26 by the input receiving unit 73, the sales registration unit 74 performs a settlement process of one transaction of all merchandise that has been sales-registered and registers the sales information to a sales table or the like.

Descriptions of Contents of Display Screen

Figure 5A:
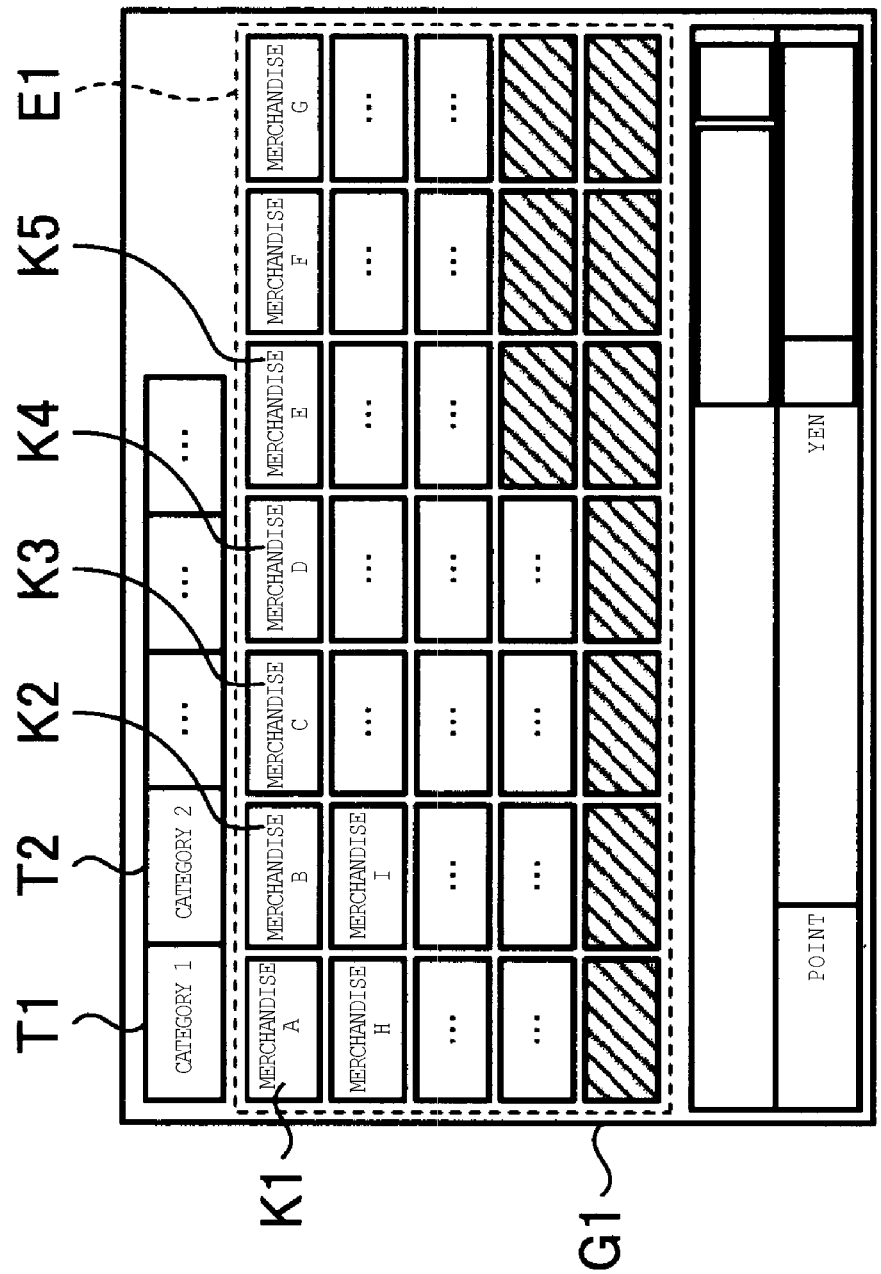
FIG. 5A illustrates an example of a pre-set screen.
Figure 5B:
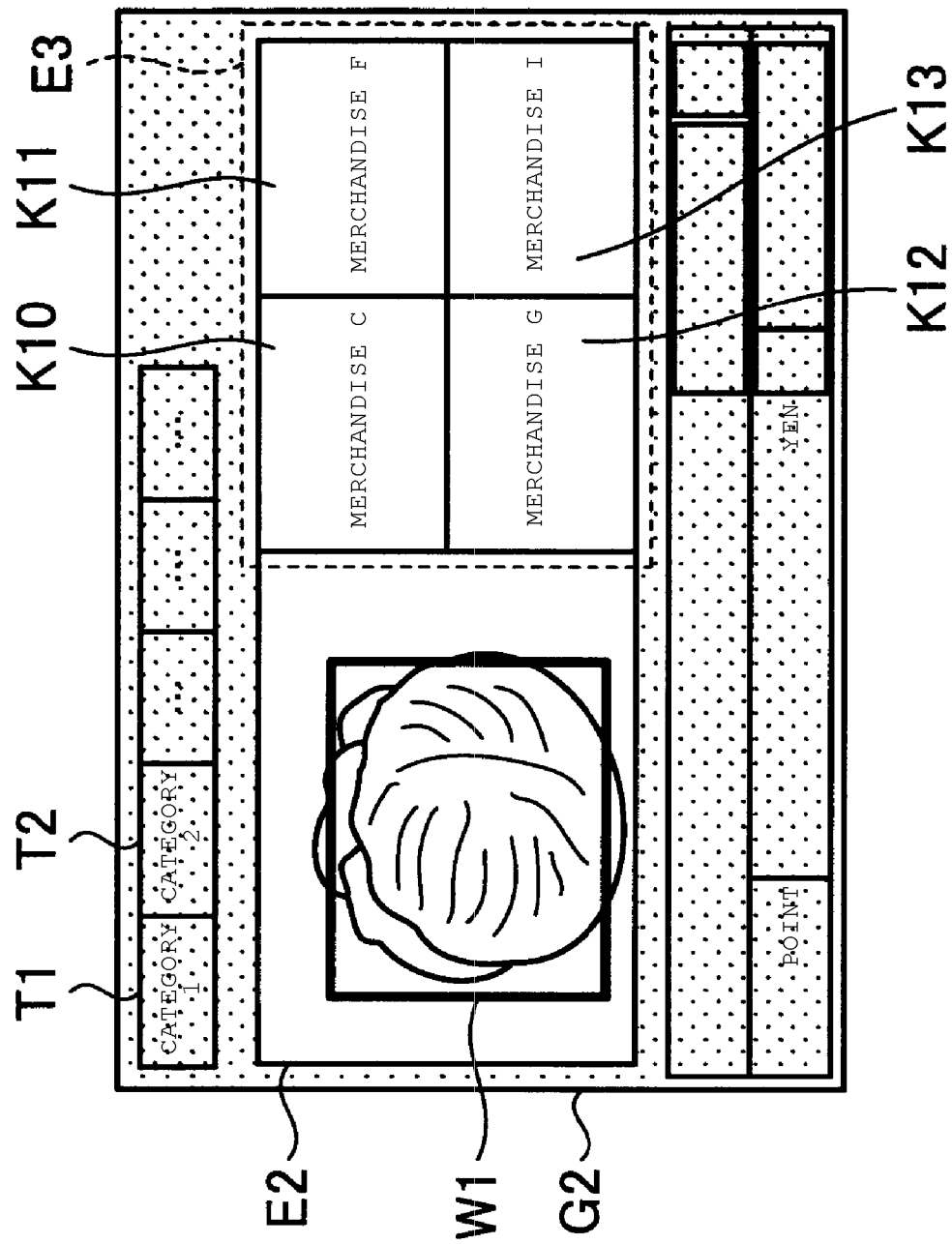
FIG. 5B illustrates an example of a selection screen on which a selection button of a merchandise candidate is displayed together with a captured image of an article.
Figure 5C:
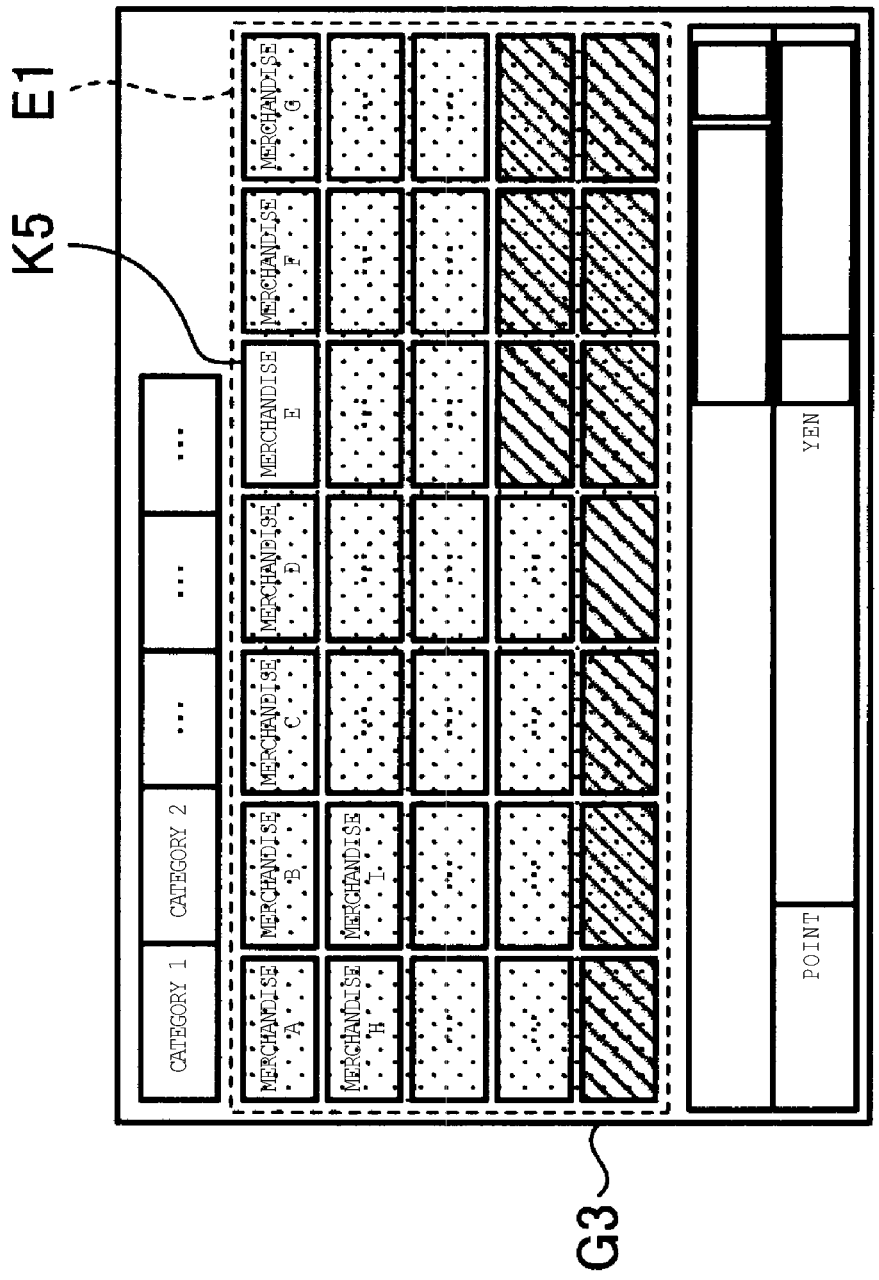
FIG. 5C illustrates an example of a reading result screen displayed when contents of a barcode attached to merchandise are read by a barcode reading process.
Figure 5D:
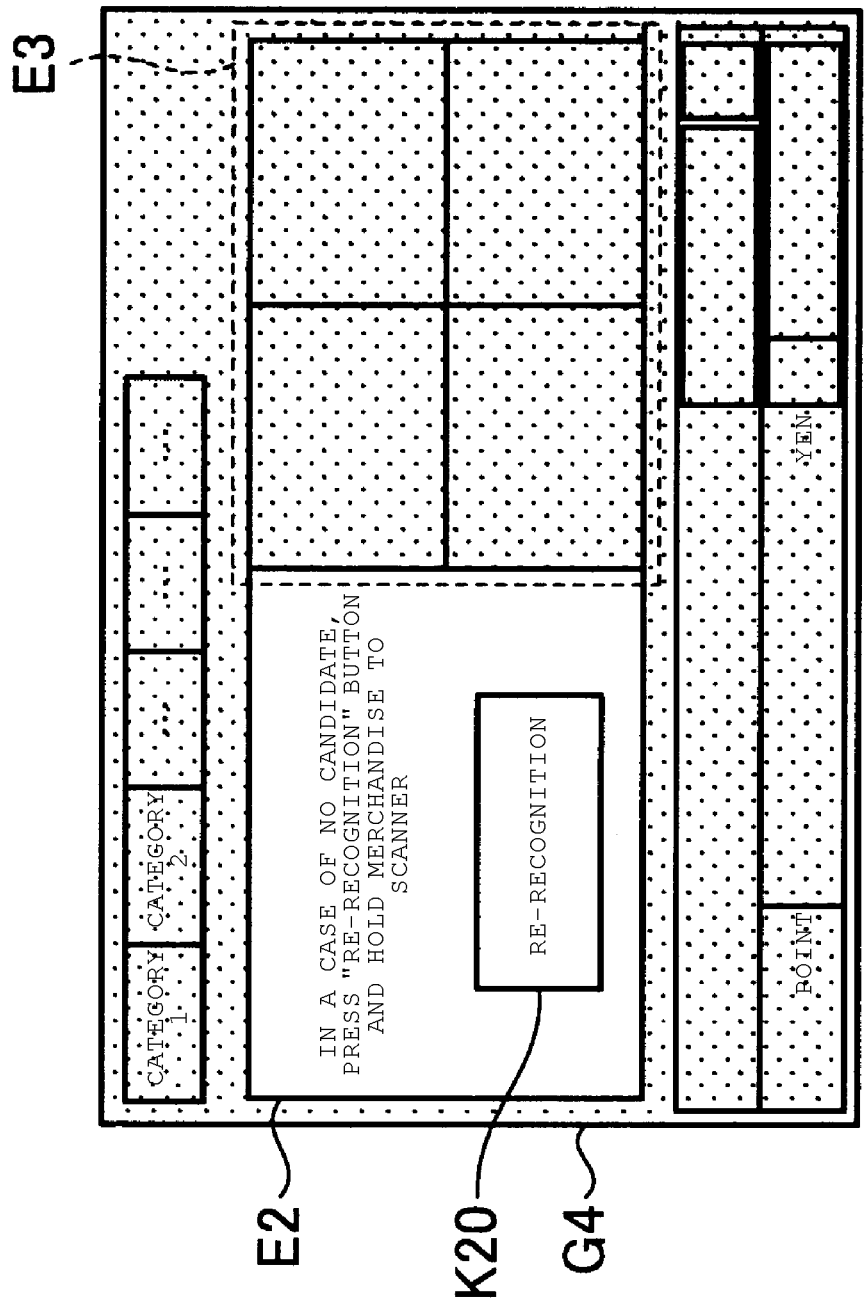
FIG. 5D illustrates an example of a re-recognition selection screen displayed in a case where the merchandise candidate is not uniquely determined.

Next, contents of a screen displayed on the third display device 106 by the check-out system 1 when registering the article G will be described. FIGS. 5A to 5D illustrate examples of screens displayed on the third display device 106. FIG. 5A is an example of the pre-set screen G1 displayed when the check-out system 1 starts to operate. FIG. 5B is an example of the selection screen G2 displayed when the merchandise candidate extraction unit 71 extracts merchandise candidates from images of the article G captured by the imaging unit 164. FIG. 5C is an example of a reading result screen G3 displayed when the barcode recognition unit 53 reads a barcode attached to the article G. FIG. 5D is an example of a re-recognition selection screen G4 displayed when the merchandise candidate extraction unit 71 cannot extract the merchandise candidates from images of the article G captured by the imaging unit 164.

As illustrated in FIG. 5A, the pre-set screen G1 has tabs T1, T2, . . . , a selection button display area E1, and the like. The tabs T1, T2, . . . are buttons for switching selection buttons by categories and displaying the selection buttons. The selection button display area E1 is a display area in which selection buttons K1, K2, K3, K4, K5, . . . of a category designated by the tabs T1, T2, . . . are displayed at respective positions determined.

In a case of performing sales registration of merchandise without performing the object recognition process or the barcode reading process described above, the cashier designates a category among the tabs T1, T2, . . . by a touch input of the screen and further selects the corresponding selection buttons K1, K2, K3, K4, K5, . . . from the selection button display area E1 corresponding to the selected category. Operation information of the selection buttons K1, K2, K3, K4, K5, . . . selected by this operation is received by the input receiving unit 73 of the POS terminal 11. Merchandise information corresponding to the operated selection buttons K1, K2, K3, K4, K5, . . . is retrieved from the PLU file F1 (FIG. 2) and is sales-registered by the sales registration unit 74 (FIG. 4).

In a case where the barcode recognition unit 53 (FIG. 4) performs a barcode reading process of reading a barcode of the article G and recognizes contents of the barcode, the display control unit 72 displays the reading result screen G3 illustrated in FIG. 5C. That is, the display control unit 72 displays only a selection button (in this case, the selection button K5) corresponding to the contents of the recognized barcode in the selection button display area E1 of the reading result screen G3 in an operable state. The display control unit 72 displays selection buttons other than the selection button K5 in an inoperable state, such as greyed-out on the reading result screen G3. After the cashier checks that the selection button K5 displayed in the operable state corresponds to the article G, the cashier presses the selection button K5. Then, operation information of the selection button K5 is received by the input receiving unit 73 of the POS terminal 11. Merchandise information corresponding to the operated selection button K5 is called from the PLU file F1 (FIG. 2) and is sales-registered by the sales registration unit 74 (FIG. 4). Here, a configuration in which a result of the barcode reading process is displayed as the reading result screen G3 and the cashier performs sales registration after checking the displayed contents is described, the configuration is not limited thereto. That is, on condition that the article G is specified based on the result of the barcode reading process, sales registration may be performed without the cashier re-checking a result of specifying the article G.

Further, as illustrated in FIG. 5B, in a case where it is necessary to perform object recognition for specifying the article G imaged in the captured image, the display control unit 72 displays the selection screen G2 having merchandise candidates obtained by the object recognition process. At this time, the display control unit 72 simultaneously displays an image of the article G captured by the imaging unit 164 in a captured image display area E2. At this time, the display control unit 72 superimposes and displays an object detection frame W1 indicating a position of the article G object-recognized by the merchandise candidate extraction unit 71 on the image of the article G. The cashier sees the displayed image and checks that the article G is properly imaged in the captured image display area E2 and that the object detection frame W1 is correctly superimposed on the article G.

The display control unit 72 displays, for example, the top four pieces of merchandise with the highest similarity among merchandise candidates extracted by the merchandise candidate extraction unit 71 (FIG. 4) in a merchandise candidate display area E3 on the selection screen G2. That is, the display control unit 72 displays selection buttons (K10, K11, K12, and K13) in the merchandise candidate display area E3.

In addition, on the condition that the article G imaged in the captured image is a target article for object recognition and the merchandise candidate extraction unit 71 cannot extract a merchandise candidate from the captured image, the display control unit 72 displays the re-recognition selection screen G4 suggesting execution of re-recognition illustrated in FIG. 5D. That is, the display control unit 72 displays a message suggesting execution of re-recognition and a re-recognition start button K20 in the captured image display area E2 of the re-recognition selection screen G4. Further, the display control unit 72 displays the merchandise candidate display area E3 of the re-recognition selection screen G4 in an inoperable state such as greyed-out.

Descriptions of Screen Transition in Third Display Device

Figure 6:
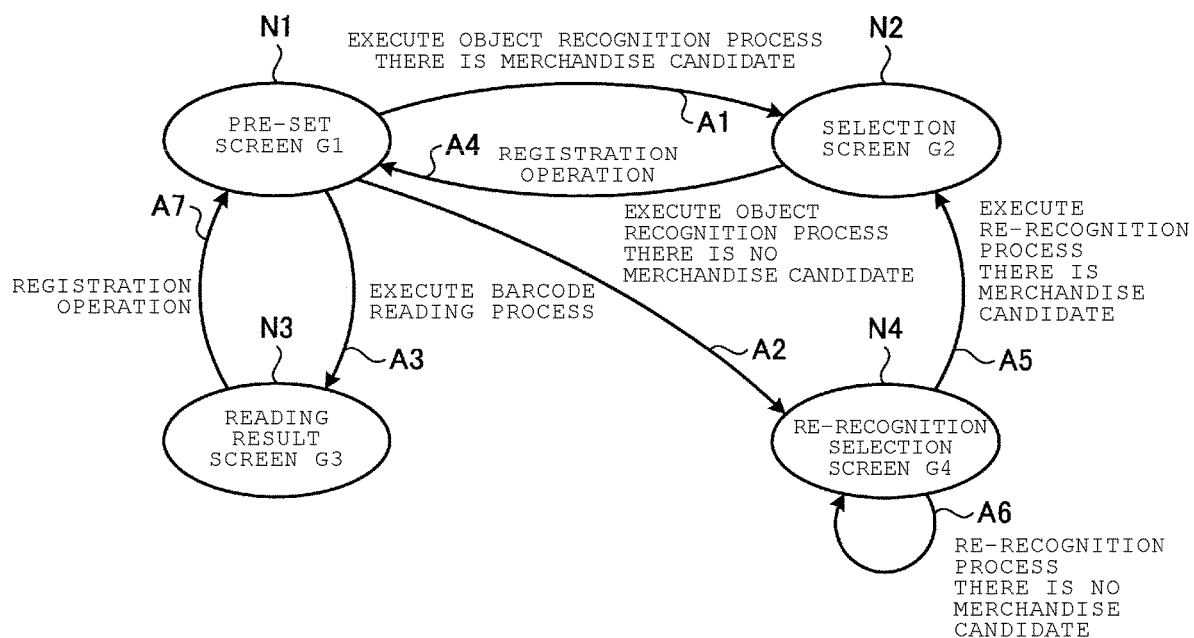
FIG. 6 is a state transition diagram illustrating an example of screen transitions.

Next, screen transition displayed on the third display device 106 by the check-out system 1 will be described. FIG. 6 is a state transition diagram illustrating an example of screen transitions on the third display device 106.

In a state (node N1) where the pre-set screen G1 (FIG. 5A) is displayed on the third display device 106, when the object recognition application determination unit 55 determines that the article G is a target article for object recognition, the merchandise candidate extraction unit 71 performs the object recognition process. Then, when a merchandise candidate is extracted (arc A1), the display control unit 72 displays the selection screen G2 having the captured image and the merchandise candidate on the third display device 106 (node N2).

On the other hand, in a state of the node N1, when the merchandise candidate extraction unit 71 performs the object recognition process and the merchandise candidate is not extracted (arc A2), the display control unit 72 displays the re-recognition selection screen G4 on the third display device 106 (node N4).

Further, in a state of the node N1, when the object recognition application determination unit 55 determines that the article G is a non-target article for object recognition, the barcode recognition unit 53 performs a barcode reading process (arc A3). Then, the display control unit 72 displays the reading result screen G3 on the third display device 106 (node N3).

In a state (node N2) where the selection screen G2 is displayed on the third display device 106, when the cashier presses the selection buttons (K10, K11, K12, and K13) (FIG. 5B) corresponding to the article G in the selection screen G2 and performs a registration operation (arc A4), the sales registration unit 74 (FIG. 4) registers the article G as purchased merchandise. Then, the display control unit 72 displays the pre-set screen G1 on the third display device 106 (node N1).

In a state (node N4) where the re-recognition selection screen G4 is displayed on the third display device 106, when the cashier presses the re-recognition start button K20 (FIG. 5D), the article reading device 101 performs the object recognition process again. As a result, when a merchandise candidate is extracted (arc A5), the display control unit 72 displays the selection screen G2 having the captured image and the merchandise candidate on the third display device 106 (node N2).

On the other hand, in a state of the node N4, when the merchandise candidate extraction unit 71 performs the object recognition process again and the merchandise candidate is not extracted (arc A6), the display control unit 72 displays the re-recognition selection screen G4 on the third display device 106 again (node N4).

In a state (node N3) where the reading result screen G3 is displayed on the third display device 106, when the cashier presses the selection button K5 (FIG. 5C) selected by the barcode reading process and performs the registration operation on the reading result screen G3 (arc A7), the sales registration unit 74 registers the article G as purchased merchandise. Then, the display control unit 72 displays the pre-set screen G1 on the third display device 106 (node N1).

Descriptions of Operation of Check-Out System

Figure 7:
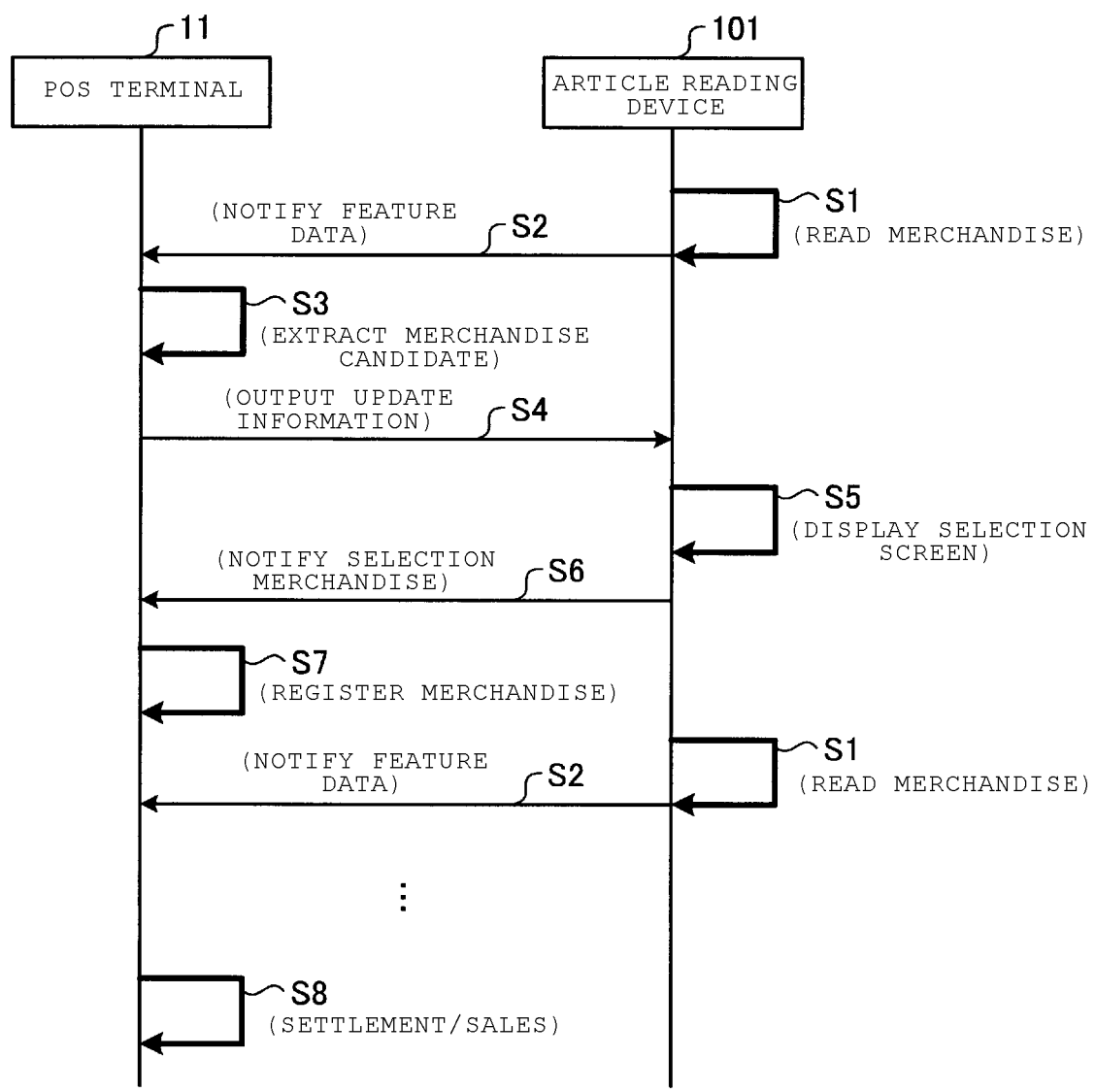
FIG. 7 is a sequence diagram illustrating a process example for performing one transaction.

Next, an operation example of the check-out system 1 will be described. FIG. 7 is a sequence diagram illustrating a process example for performing one transaction of merchandise registration and a settlement process of the check-out system 1. In the following description, in the POS terminal 11, it is assumed that the program stored in the ROM 62 and the program PR stored in the HDD 64 are executed by the CPU 61 and functional units such as the merchandise candidate extraction unit 71, the display control unit 72, the input receiving unit 73, the sales registration unit 74, and the like are realized. In addition, in the article reading device 101, it is assumed that the program stored in the ROM 162 is executed by the CPU 161 and functional units such as the image capturing unit 51, the merchandise detection unit 52, the barcode recognition unit 53, the feature data extraction unit 54, the object recognition application determination unit 55, and the like are realized. Further, in the article reading device 101, the pre-set screen G1 (FIG. 5A) is displayed on the third display device 106 and the imaging unit 164 is also always activated.

First, the article reading device 101 detects that the article G is held by the reading window 103 and performs a reading process of the article G (step S1). Specifically, when the cashier picks up the article G before reading from the first shopping basket 153a illustrated in FIG. 1 and moves the article G to the second shopping basket 153b, the article G is held by the reading window 103 and an appearance of the merchandise is read by the imaging unit 164 (FIG. 2). The article reading device 101 obtains an image captured by the imaging unit 164 from the image capturing unit 51 (FIG. 4) and stores the image in the RAM 163. Then, the merchandise detection unit 52 detects the article G from the image. At this time, the feature data extraction unit 54 extracts the feature data 80b of the detected article G and the object recognition application determination unit 55 determines whether or not the article G is a non-target article for object recognition based on the feature data 80b.

Next, the CPU 161 of the article reading device 101 provides the feature data 80a extracted by the feature data extraction unit 54 to the merchandise candidate extraction unit 71 of the POS terminal 11 (step S2). Further, based on a determination result of the object recognition application determination unit 55, on condition that the article G is not a non-target article for object recognition, the CPU 161 provides instructions to perform the object recognition process to the merchandise candidate extraction unit 71.

In the POS terminal 11, the merchandise candidate extraction unit 71 performs the object recognition process and extracts merchandise information from the PLU file F1 in descending order of similarities based on the feature data 80a notified from the article reading device 101. The merchandise candidate extraction unit 71 outputs the extracted merchandise candidate information to the display control unit 72 (step S3). The number of pieces of output merchandise candidate information may be appropriately set. In the present embodiment, the top four pieces of merchandise candidate information are extracted.

Further, in the POS terminal 11, the display control unit 72 outputs the selection buttons (K10, K11, K12, and K13) (FIG. 5B) corresponding to top four merchandise candidates extracted as merchandise candidate information to the third display device 106 of the article reading device 101 as update information of the pre-set screen G1 (step S4).

Based on the update information output by the display control unit 72, the article reading device 101 displays the selection screen G2 (FIG. 5B) of the merchandise candidates to the third display device 106 (step S5).

The cashier selects a selection button (any one of K10, K11, K12, and K13 illustrated in FIG. 5B) corresponding to the merchandise candidates of the selection screen G2 via the touch panel 105 (or the keyboard 107) which is the input receiving unit 73. Then, in the article reading device 101, an input/output circuit (not illustrated) of the touch panel 105 (or the keyboard 107) notifies operation information of the article reading device 101 to the input receiving unit 73 of the POS terminal 11 (step S6).

When the input receiving unit 73 of the POS terminal 11 receives merchandise information corresponding to the article G selected by the cashier, the sales registration unit 74 registers the merchandise information to a registration table or the like (step S7).

The processes from step S1 to step S7 described above are performed for all of the articles G in the first shopping basket 153a illustrated in FIG. 1. After that, the cashier presses a sum key of the keyboard 22 or the touch panel 26 in the POS terminal 11. The input receiving unit 73 of the POS terminal 11 receives a notification that a pressing operation is performed, and the sales registration unit 74 performs a merchandise settlement process and registers sales information to a sales table or the like (step S8).

Descriptions of Flow of Process Performed by Check-Out System

Figure 8:
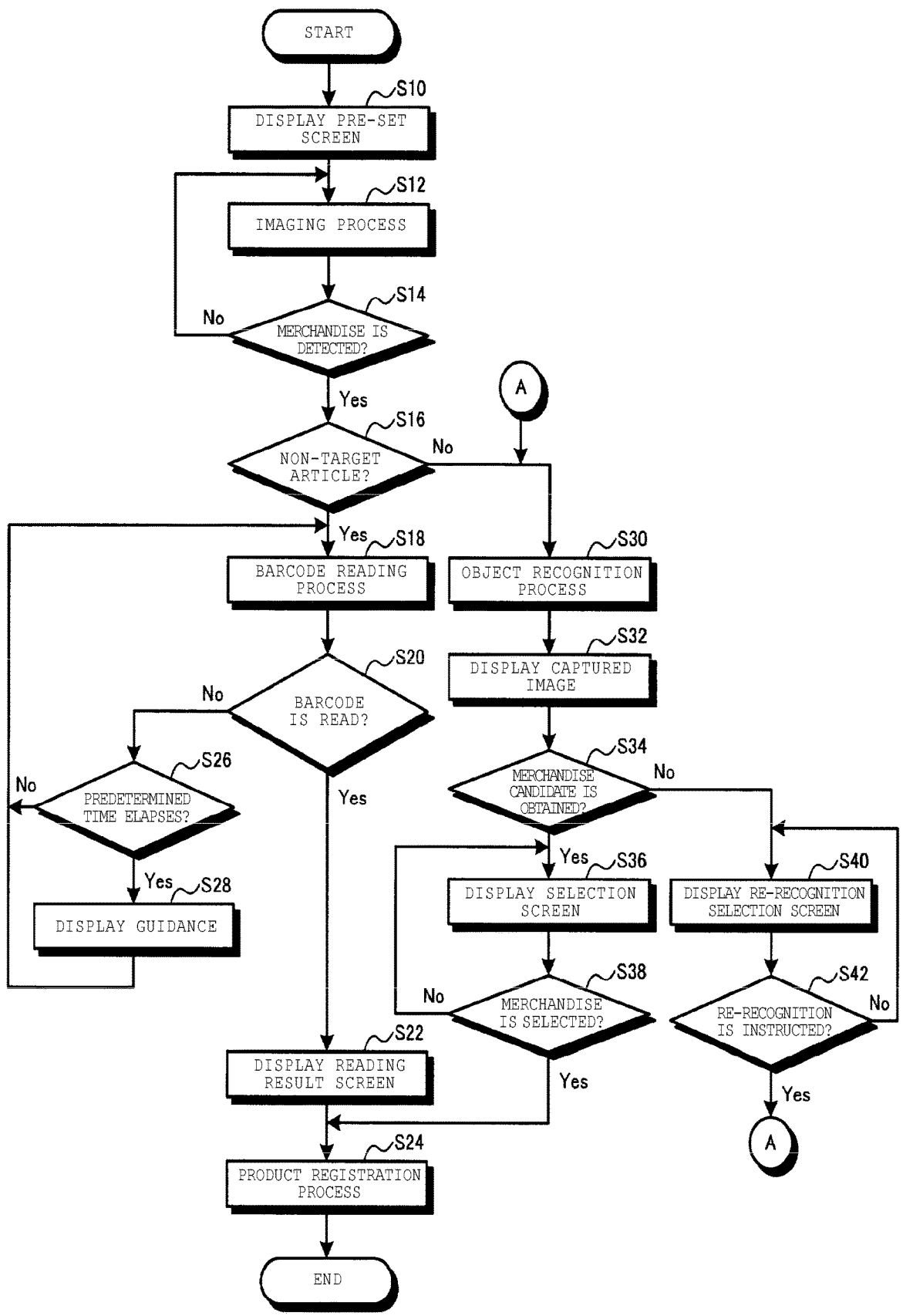
FIG. 8 is a flow chart illustrating an example sequence of operations for a series of merchandise registration processes.

Next, a flow of processes performed by the check-out system 1 will be described. FIG. 8 is a flowchart illustrating an example sequence of operations for a series of merchandise registration processes performed by the check-out system 1.

The display control unit 72 displays the pre-set screen G1 (FIG. 5A) on which predetermined selection buttons (K1, K2, . . . ) are displayed on the third display device 106 (step S10).

The image capturing unit 51 performs an imaging process of capturing an image of the article G by controlling the imaging unit 164 (FIG. 2) (step S12).

The merchandise detection unit 52 determines whether or not merchandise is detected (step S14). When the merchandise detection unit 52 detects the merchandise (step S14: Yes), the process proceeds to step S16. Otherwise (step S14: No), the process returns to step S12.

The object recognition application determination unit 55 determines whether or not the article G is a non-target article for object recognition based on the feature data 80b of the article G imaged in the captured image (step S16). When the article G is a non-target article for object recognition (step S16: Yes), the process proceeds to step S18. Otherwise (step S16: No), the process proceeds to step S30.

The barcode recognition unit 53 performs a barcode reading process of reading contents of a barcode with respect to the captured image (step S18).

The barcode recognition unit 53 determines whether or not the contents of the barcode are read (step S20). When the contents of the barcode are read (step S20: Yes), the process proceeds to step S22. Otherwise (step S20: No), the process proceeds to step S26.

The display control unit 72 displays the reading result screen G3 (FIG. 5C) on the third display device 106 (step S22).

The sales registration unit 74 receives a notification that the cashier performs an operation of selecting merchandise read by the barcode reading process with respect to the input receiving unit 73, and performs a merchandise registration process (step S24). After that, the process in FIG. 8 is ended. Although not described in the flowchart of FIG. 8, in a case where unregistered merchandise remains, the process returns to step S10 and the same process is repeated. In addition, as described above, when the barcode recognition unit 53 reads the contents of the barcode, a merchandise registration process may be performed without displaying the reading result screen G3.

In step S20, when it is determined that the barcode recognition unit 53 does not read the contents of the barcode (step S20: No), the barcode recognition unit 53 determines whether or not a predetermined time elapses (step S26). When the predetermined time elapses (step S26: Yes), the process proceeds to step S28. Otherwise (step S26: No), the process returns to step S18.

When the barcode recognition unit 53 does not read the barcode even after the predetermined time elapses (step S26: Yes), the display control unit 72 displays guidance such as "Please change the direction to hold the merchandise" or the like on the third display device 106 (step S28). After that, the process returns to step S18.

In step S16, when the object recognition application determination unit 55 determines that the article G imaged in the captured image is not a non-target article for object recognition (step S16: No), the merchandise candidate extraction unit 71 performs the object recognition process (step S30).

The display control unit 72 displays the captured image on the third display device 106 (step S32).

As a result of performing the object recognition process, the merchandise candidate extraction unit 71 determines whether or not a merchandise candidate is obtained (step S34). When the merchandise candidate is obtained (step S34: Yes), the process proceeds to step S36. When the merchandise candidate is not obtained (step S34: No), the process proceeds to step S40.

The display control unit 72 displays the selection screen G2 (FIG. 5B) having top four merchandise candidates in descending order of similarities on the third display device 106 (step S36).

The input receiving unit 73 determines whether or not merchandise is selected from the selection screen G2 (step S38). When the merchandise is selected (step S38: Yes), the process proceeds to step S24. Otherwise (step S38: No), the process returns to step S36.

In step S34, when the merchandise candidate is not obtained (step S34: No), the display control unit 72 displays the re-recognition selection screen G4 (FIG. 5D) suggesting execution of re-recognition on the third display device 106 (step S40).

The input receiving unit 73 determines whether or not re-recognition is instructed (step S42). When the re-recognition is instructed (step S42: Yes), the process proceeds to step S30. Otherwise (step S42: No), the process returns to step S40.

In the present embodiment, on the third display device 106, the display control unit 72 displays captured images which have not yet been displayed at a timing during which object recognition is executed and removes an image of the article G at a timing during which the merchandise candidate is selected. Display control performed by the display control unit 72 is not limited thereto. That is, the display control unit 72 may always display the captured image captured by the imaging unit 164 in a display screen of the third display device 106 with a predetermined size and may perform display control to enlarge a display size of the captured image at a timing during which object recognition is executed. At this time, the display control unit 72 returns the captured image enlarged to a predetermined size at a timing during which the cashier selects a merchandise candidate.

Descriptions of Flow of Modification Example of Process Performed by Check-Out System Next, a modification example of a series of processes performed by the check-out system 1 will be described with reference to FIG. 9. Since a configuration of the modification example is the same as that of the check-out system 1 described above, each of components will be described using the same reference numerals.

In this modification example, an operation of the object recognition application determination unit 55 is different from the configuration described above. That is, in the configuration (FIG. 8) described above, the object recognition application determination unit 55 determines whether or not the article G is a non-target article for object recognition based on the feature data 80b of the article G imaged in the captured image. However, in the modification example (FIG. 9) described below, the object recognition application determination unit 55 determines whether or not the article G is a non-target article for object recognition based on a barcode reading result from the article G.

Figure 9:
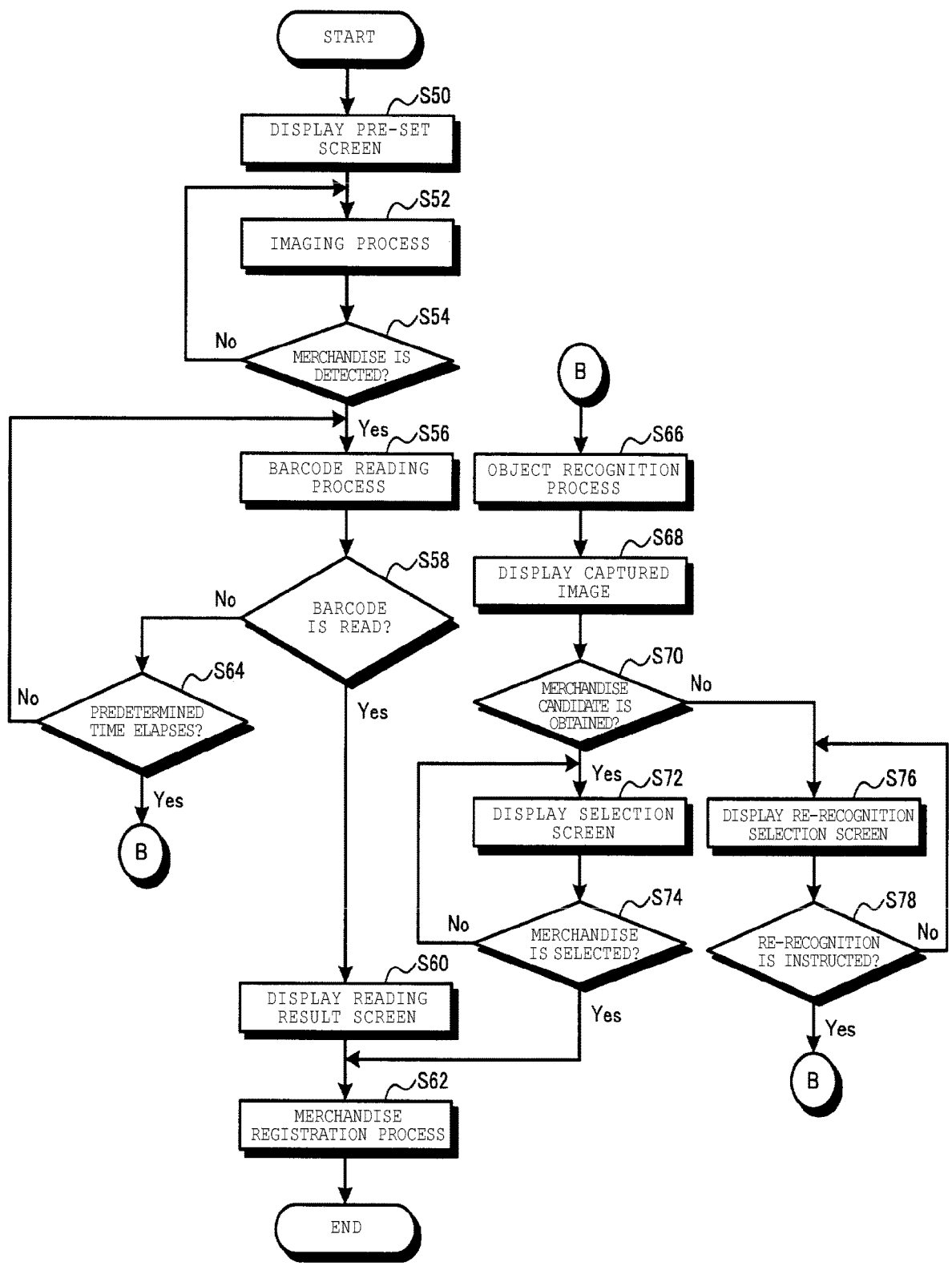
FIG. 9 is a flow chart illustrating a modified example sequence of operations for the series of merchandise registration processes.

FIG. 9 is a flow chart illustrating the modification example of a flow of a series of processes performed by the check-out system 1. The display control unit 72 displays the pre-set screen G1 (FIG. 5A) on which predetermined selection buttons (K1, K2, . . . ) are disposed on the third display device 106 (step S50).

The image capturing unit 51 performs an imaging process of capturing an image of the article G by controlling the imaging unit 164 (FIG. 2) (step S52).

The merchandise detection unit 52 determines whether or not merchandise is detected (step S54). When the merchandise detection unit 52 detects the merchandise (step S54: Yes), the process proceeds to step S56. Otherwise (step S54: No), the process returns to step S52.

The barcode recognition unit 53 performs a barcode reading process of reading contents of a barcode with respect to the captured image (step S56).

The barcode recognition unit 53 determines whether or not the contents of the barcode are read (step S58). When the contents of the barcode are read (step S58: Yes), the process proceeds to step S60. Otherwise (step S58: No), the process proceeds to step S64.

The display control unit 72 displays the reading result screen G3 (FIG. 5C) on the third display device 106 (step S60).

The sales registration unit 74 receives notification that the cashier performs an operation of selecting merchandise read by the barcode reading process with respect to the input receiving unit 73, and performs a merchandise registration process (step S62). After that, the process in FIG. 9 is ended. Although not described in a flowchart of FIG. 9, in a case where unregistered merchandise remains, the process returns to step S50 and the same process is repeated. In addition, when the barcode recognition unit 53 reads the contents of the barcode, a merchandise registration process may be performed without displaying the reading result screen G3.

In step S58, when it is determined that the barcode recognition unit 53 does not read the contents of the barcode (step S58: No), the barcode recognition unit 53 determines whether or not a predetermined time elapses (step S64). When the predetermined time elapses (step S64: Yes), the process proceeds to step S66. When the predetermined time does not elapse (step S64: No), the process returns to step S56.

In step S64, when it is determined that the barcode recognition unit 53 does not read the barcode even after the predetermined time elapses (step S64: Yes), the object recognition application determination unit 55 determines that the article G imaged in the captured image is a target article for object recognition and the merchandise candidate extraction unit 71 performs the object recognition process (step S66).

The display control unit 72 displays the captured image on the third display device 106 (step S68).

As a result of performing the object recognition process, the merchandise candidate extraction unit 71 determines whether or not a merchandise candidate is obtained (step S70). When the merchandise candidate is obtained (step S70: Yes), the process proceeds to step S72. When the merchandise candidate is not obtained (step S70: No), the process proceeds to step S76.

The display control unit 72 displays the selection screen G2 (FIG. 5B) having top four merchandise candidates in descending order of similarities on the third display device 106 (step S72).

The input receiving unit 73 determines whether or not merchandise is selected from the selection screen G2 (step S74). When the merchandise is selected (step S74: Yes), the process proceeds to step S62. Otherwise (step S74: No), the process returns to step S72.

In step S70, when the merchandise candidate is not obtained (step S70: No), the display control unit 72 displays the re-recognition selection screen G4 (FIG. 5D) suggesting execution of re-recognition on the third display device 106 (step S76).

The input receiving unit 73 determines whether or not re-recognition is instructed (step S78). When the re-recognition is instructed (step S78: Yes), the process returns to step S66. Otherwise (step S78: No), the process returns to step S76.

As described above, in the check-out system 1 according to the embodiment, based on the feature data 80b of the article G extracted by the feature data extraction unit 54, the object recognition application determination unit 55 determines whether the article G is a target article requiring a recognition result of the merchandise candidate extraction unit 71 or a target article requiring a reading result of the barcode recognition unit 53 among captured images obtained by imaging an appearance of the article G. Based on a determination result of the object recognition application determination unit 55, the display control unit 72 controls a display state of the captured image for the third display device 106. Therefore, in a case where the article G is a target article requiring a recognition result of the merchandise candidate extraction unit 71, it is possible to display the captured image of the article G for easy viewing. Thereby, when an image of the article G is captured, it is possible to prevent the article G from protruding from an imaging range of merchandise and to capture the image for easy recognizing.

In addition, in the check-out system 1 according to the embodiment, based on the feature data 80b, extracted by the feature data extraction unit 54, representing a similarity with a non-target article for object recognition, the object recognition application determination unit 55 distinguishes whether or not the article G is a non-target article for object recognition. Therefore, it is possible to reliably determine whether or not object recognition is necessary when registering the article G.

In the check-out system 1 according to the embodiment, on condition that a code symbol cannot be read within a predetermined time after the barcode recognition unit 53 starts to read the code symbol of the article G, the object recognition application determination unit 55 determines that the article G is a target article for object recognition. Therefore, it is possible to reliably determine whether or not object recognition is necessary when registering the article G.

Further, in the check-out system 1 according to the embodiment, on condition that the object recognition application determination unit 55 determines that the article G is a target article for object recognition, the display control unit 72 displays the captured image of the article G on the third display device 106. Then, on condition that it is determined that the article G is a non-target article for object recognition, the object recognition application determination unit 55 does not display the captured image of the article G on the third display device 106. Therefore, when the object recognition process is necessary, it is possible to display the captured image of the article G for easy viewing without performing a special operation.

In addition, in the check-out system 1 according to the embodiment, on condition that the object recognition application determination unit 55 determines that the article G is a non-target article for object recognition, the display control unit 72 displays the captured image on the third display device 106 at a predetermined display size. Then, on condition that it is determined that the article G is a target article for object recognition, the object recognition application determination unit 55 enlarges the captured image more than the predetermined display size and displays the captured image on the third display device 106. Therefore, when the object recognition process is necessary, it is possible to display the captured image of the merchandise for easy viewing without performing a special operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article reading device comprising:
a display device;
an image capturing device configured to generate an image of an article; and
a processor configured to:
generate a first screen to be displayed on the display device, indicating a plurality of articles selectable for article registration,
control the image capturing device to generate the image and perform first object recognition on the image to identify a type of the article,
when the type of the article is identified as a first type, perform second object recognition on the image to determine one or more candidate articles,
when one or more candidate articles are determined, generate a second screen to be displayed on the display device, indicating the image and said one or more candidate articles selectable for article registration, and when no candidate article is determined, generate a third screen to be displayed on the display device, indicating a button to retry the second object recognition, and when the type of the article is identified as a second type that is different from the first type,
extract a barcode from the image,
identify the article based on the extracted barcode, and
update the first screen so that the identified article is selectable for article registration.

2. The article reading device according to claim 1, wherein
the processor is configured to switch the second screen to the first screen when one of the candidate articles is selected.

3. The article reading device according to claim 1, wherein
the processor is configured to
after the third screen is displayed, control the image capturing device to generate another image of another article and perform third object recognition on said another image to identify a type of said another article, and
when the type of said another article is identified as the first type,
perform fourth object recognition on said another image to determine one or more candidate articles, and
when one or more candidate articles are determined, generate a fourth screen to be displayed on the display device, indicating said another image and said one or more candidate articles selectable for article registration.

4. The article reading device according to claim 1, wherein
the processor is configured to, after the first screen is updated, when the identified article is selected, further update the first screen so that the plurality of articles are selectable for article registration.

5. The article reading device according to claim 1, further comprising:
a network interface, wherein
the processor is configured to control the network interface to transmit a result of the second object recognition to a POS terminal that determines said one or more candidate articles.

6. The article reading device according to claim 5, wherein
in response to the transmission of the result of the second object recognition, information about the candidate articles is received from the POS terminal.

7. The article reading device according to claim 6, wherein
the information about the candidate articles includes an image of each of the candidate articles.

8. The article reading device according to claim 1, wherein
the display device includes a touch panel, and
the selection of one of the candidate articles is made via the touch panel.

9. The article reading device according to claim 1, wherein
the processor is configured to determine whether an article is positioned within an image capturing area of the image capturing device, and
the image is generated when the article is determined to be positioned within the image capturing area.

10. The article reading device according to claim 1, further comprising:
a network interface, wherein
the processor controls the network interface to transmit information about the article selected via the first screen or one of said one or more candidate articles selected via the second screen to a POS terminal for article registration.

11. An article reading method comprising:
displaying a first screen indicating a plurality of articles selectable for article registration;
generating an image of an article;
performing first object recognition on the image to identify a type of the article;
when the type of the article is identified as a first type,
performing second object recognition on the image to determine one or more candidate articles,
when one or more candidate articles are determined, displaying a second screen indicating the image and said one or more candidate articles selectable for article registration, and
when no candidate article is determined, displaying a third screen indicating a button to retry the second object recognition; and
when the type of the article is identified as a second type that is different from the first type,
extracting a barcode from the image,
identifying the article based on the extracted barcode, and
updating the first screen so that only the identified article is selectable for article registration.

12. The article reading method according to claim 11, further comprising:
switching the second screen to the first screen when one of the candidate articles is selected.

13. The article reading method according to claim 11, further comprising:
after the third screen is displayed,
generating another image of another article,
performing third object recognition on said another image to identify a type of said another article, and
when the type of said another article is identified as the first type,
performing fourth object recognition on said another image to determine one or more candidate articles, and
when one or more candidate articles are determined, generating a fourth screen to be displayed on the display device, indicating said another image and said one or more candidate articles selectable for article registration.

14. The article reading method according to claim 11, further comprising:
after the first screen is updated, when the identified article is selected, further updating the first screen so that the plurality of articles are selectable for article registration.

15. The article reading method according to claim 11, further comprising:
   transmitting a result of the second object recognition to a POS terminal that determines said one or more candidate articles.

16. The article reading method according to claim 15, further comprising:
   in response to the transmission of the result of the second object recognition, receiving information about the candidate articles from the POS terminal.

17. The article reading method according to claim 16, wherein
   the information about the candidate articles includes an image of each of the candidate articles.

18. The article reading method according to claim 11, wherein
   the selection of one of the candidate articles is made via a touch panel.

19. The article reading method according to claim 11, further comprising:
   determining whether an article is positioned within an image capturing area of the image capturing device, wherein
   the image is generated when the article is determined to be positioned within the image capturing area.

20. An article registration system comprising:
   a POS terminal configured to perform article registration on one or more articles to be purchased by a customer; and
   an article reading device including
     a display device,
     a network interface,
     an image capturing device configured to generate an image of an article, and
     a processor configured to:
       generate a first screen to be displayed on the display device, indicating a plurality of articles selectable for article registration,
       control the image capturing device to generate the image and perform first object recognition on the image to identify a type of the article,
       when the type of the article is identified as a first type,
         perform second object recognition on the image to determine one or more candidate articles,
         when one or more candidate articles are determined, generate a second screen to be displayed on the display device, indicating the image and said one or more candidate articles selectable, and upon selection of one of the candidate articles, control the network interface to transmit information about the selected candidate article to the POS terminal for article registration,
         when no candidate article is determined, generate a third screen to be displayed on the display device, indicating a button to retry the object recognition,
       when the type of the article is identified as a second type that is different from the first type,
         extract a barcode from the image,
         identify the article based on the extracted barcode,
         update the first screen so that only the identified article is selectable for article registration, and
         upon selection of the identified article, control the network interface to transmit information about the selected article to the POS terminal for article registration.

* * * * *

UNITED STATES PATENT AND TRADEMARK OFFICE
CERTIFICATE OF CORRECTION

PATENT NO. : 11,392,917 B2
APPLICATION NO. : 16/818341
DATED : July 19, 2022
INVENTOR(S) : Hidehiro Naitou et al.

Page 1 of 1

It is certified that error appears in the above-identified patent and that said Letters Patent is hereby corrected as shown below:

On the Title Page

Insert --(30) Foreign Application Priority Data : Sep. 2, 2016 (JP)....JP2016-171795--.

Signed and Sealed this
Thirtieth Day of January, 2024

Katherine Kelly Vidal
*Director of the United States Patent and Trademark Office*